United States Patent
Nicholas et al.

(10) Patent No.: US 8,894,286 B2
(45) Date of Patent: Nov. 25, 2014

(54) BRIDGE SPRING CENTERING DEVICE FOR SQUEEZE FILM DAMPERS

(75) Inventors: John C. Nicholas, Wellsville, NY (US); Thomas P. Shoup, Wellsville, NY (US); Donald H. Rockefeller, Little Genesee, NY (US)

(73) Assignee: Lufkin Industries, LLC, Dallas, TX (US)

( * ) Notice: Subject to any disclaimer, the term of this patent is extended or adjusted under 35 U.S.C. 154(b) by 17 days.

(21) Appl. No.: 13/304,210

(22) Filed: Nov. 23, 2011

(65) Prior Publication Data

US 2012/0141056 A1  Jun. 7, 2012

Related U.S. Application Data

(60) Provisional application No. 61/416,666, filed on Nov. 23, 2010.

(51) Int. Cl.
*F16C 33/04* (2006.01)
*F16C 17/03* (2006.01)
*F16F 15/023* (2006.01)

(52) U.S. Cl.
CPC ............. *F16C 27/002* (2013.01); *F16C 17/03* (2013.01); *F16F 15/0237* (2013.01)
USPC ............ 384/302; 384/125; 384/215; 384/309

(58) Field of Classification Search
CPC ...................................................... F16C 17/03
USPC ............ 384/12, 99, 117, 122, 125, 215, 302, 384/306–309, 312
See application file for complete search history.

(56) References Cited

U.S. PATENT DOCUMENTS

| | | | | |
|---|---|---|---|---|
| 3,620,581 A | * | 11/1971 | Heller et al. | 384/117 |
| 3,744,858 A | * | 7/1973 | Weichsel | 384/12 |
| 3,979,155 A | * | 9/1976 | Sood et al. | 384/117 |
| 4,214,796 A | | 7/1980 | Monzel et al. | |
| RE31,394 E | * | 9/1983 | Streifert | 384/99 |
| 4,460,283 A | * | 7/1984 | Yoshioka et al. | 384/119 |
| 4,553,855 A | * | 11/1985 | De Choudhury | 384/215 |
| 4,802,774 A | | 2/1989 | Pesikov | |
| 4,952,076 A | * | 8/1990 | Wiley et al. | 384/99 |

(Continued)

FOREIGN PATENT DOCUMENTS

DE   37 28 039 A1   3/1989
FR   2 202 555 A5   5/1974

OTHER PUBLICATIONS

International Search Report for corresponding international patent application No. PCT/US2011/062133, mailed Mar. 12, 2012.

(Continued)

*Primary Examiner* — Marcus Charles
(74) *Attorney, Agent, or Firm* — Sutton McAughan Deaver, PLLC

(57) ABSTRACT

A damper film bearing assembly for supporting a rotatable shaft includes a bearing housing having a longitudinal opening passing therethrough for receiving the rotatable shaft. The bearing housing also has at least one radial recess formed in an outer surface thereof. At least one resilient element is disposed within the recess in the bearing housing above the floor of the recess, the resilient element biasing the support piston away from the axis of the rotatable shaft. The resilient element in accordance with the disclosure may be a bridge spring or a rod spring as appropriate.

14 Claims, 11 Drawing Sheets

(56) References Cited

U.S. PATENT DOCUMENTS

| | | | |
|---|---|---|---|
| 5,044,781 A | | 9/1991 | Werner |
| 5,149,206 A | * | 9/1992 | Bobo ............................. 384/99 |
| 5,201,585 A | * | 4/1993 | Gans et al. .................... 384/215 |
| 5,215,384 A | | 6/1993 | Maier |
| 5,228,378 A | * | 7/1993 | Bathory ............................ 92/80 |
| 5,316,391 A | | 5/1994 | Monzel |
| 5,344,239 A | | 9/1994 | Stallone et al. |
| 5,603,574 A | * | 2/1997 | Ide et al. ....................... 384/117 |
| 5,613,781 A | | 3/1997 | Kuzdzal et al. |
| 5,651,616 A | * | 7/1997 | Hustak et al. ................... 384/99 |
| 5,738,445 A | * | 4/1998 | Gardner ......................... 384/312 |
| 6,065,875 A | * | 5/2000 | Mitsubori et al. .............. 384/99 |
| 7,066,651 B2 | | 6/2006 | Nicholas et al. |
| 7,625,121 B2 | * | 12/2009 | Pettinato et al. ............. 384/117 |
| 2006/0008188 A1 | | 1/2006 | Nicholas et al. |
| 2008/0095482 A1 | * | 4/2008 | Swann et al. ................. 384/302 |
| 2009/0263058 A1 | | 10/2009 | Gibbons |
| 2010/0037462 A1 | | 2/2010 | Pettinato et al. |
| 2010/0111681 A1 | * | 5/2010 | Nakano et al. ................ 384/132 |
| 2010/0177999 A1 | * | 7/2010 | Waki et al. .................... 384/312 |
| 2010/0207008 A1 | * | 8/2010 | Cottrell ......................... 248/638 |

OTHER PUBLICATIONS

Written Opinion for corresponding international patent application No. PCT/US2011/062133, mailed Mar. 12, 2012.

Edney, Stephen L. and Nicholas, John C., "Retrofitting a Large Steam Turbine with A Mechanically Centered Squeeze Film Damper," Proceedings of the 28th Turbomachinery Symposium, College Station, Texas, 1999, pp. 29-40.

Nicholas, John C., "Tilting Pad Journal Bearings with Spray-Bar Blockers and By-Pass Cooling for High Speed, High Load Applications," Proceedings of the 32nd Turbomachinery Symposium, College Station, Texas, 2003, pp. 23-37.

Nicholas, John C., Elliot, Greg, Shoup, Thomas P., and Martin, Ed, "Tilting Pad Journal Bearing Starvation Effects," Proceedings of the 37th Turbomachinery Symposium, College Station, Texas, 2008, pp. 1-10.

Nicholas, John C., "Hydrodynamic Journal Bearings—Types, Characteristics, and Applications," Mini Course Notes—Vibrations Institute, Willowbrook, Illinois, 20th Annual Meeting, Jun. 25-27, 1996.

* cited by examiner

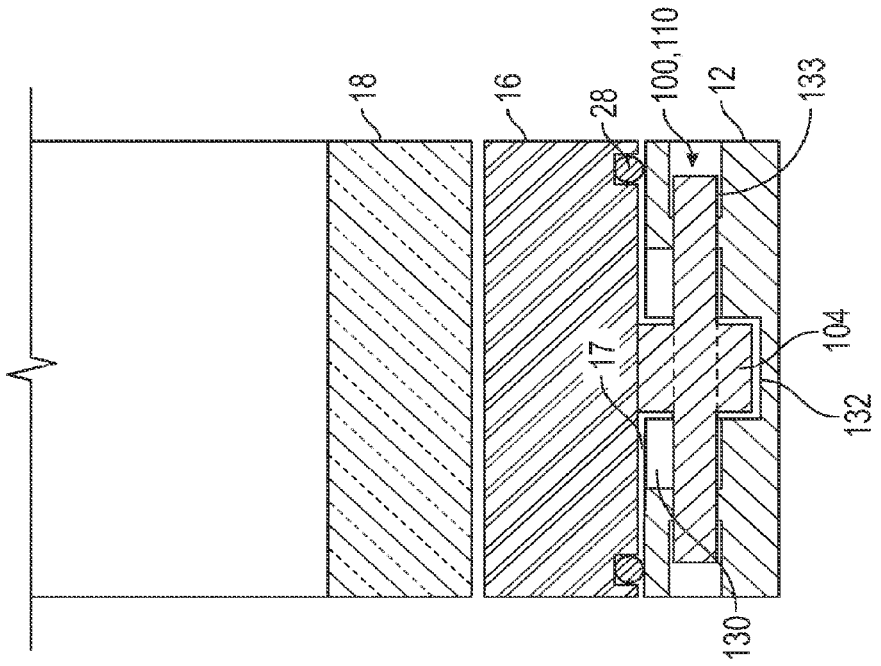
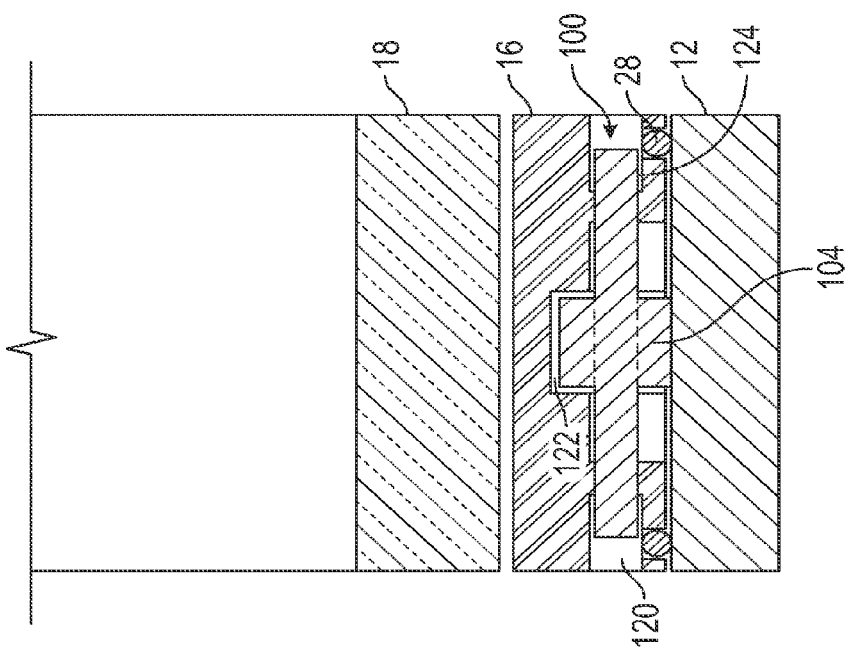

US 8,894,286 B2

BRIDGE SPRING CENTERING DEVICE FOR SQUEEZE FILM DAMPERS

CROSS REFERENCE TO RELATED APPLICATIONS

This application claims priority to U.S. Provisional patent application Ser. No. 61/416,666, filed Nov. 23, 2010, the entire disclosure of which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to bearings of the type that are typically used in conjunction with high speed rotating shafts, and more specifically are related to such bearing which incorporate squeeze film damper bearing support systems for attenuating vibrations within the bearings.

2. Description of the Related Art

The use of fluid film and squeeze film damping for high speed rotating shafts in turbomachinery have been used for years to add damping to rotor-bearing systems for vibration attenuation. Generally, in such systems, a thin oil film between the journal bearing housing and the bearing case provides damping by allowing the bearing housing to bounce around in the bearing case or adapter ring (hereinafter collectively referred to as "bearing case") within the oil film. The squeeze effect on the oil produces the damping. In a fluid film bearing, a thin fluid film forms a buffer between the rotating journal surface and the stationary bearing surface, and dampens vibration from the rotor. In a squeeze film damper bearing, a thin film of fluid is squeezed by two non-rotating cylindrical surfaces. One surface is stationary while the other is positioned by a spring bar support structure and oscillates with the motion of the rotor. The squeezing of the fluid film dampens rotor vibration through the bearing support.

Damping the vibration in a turbomachine provides quiet and comfortable operation of the machine, reduced fatigue stress on the machine and its supports, and a safeguard to the damage that can be caused by unstable vibration. Vibration in a turbomachine is usually caused by a rotating mass imbalance, e.g., rotor, or by aerodynamic forces within the turbine and/or compressor. These vibrations are not static, but vary with the operating speed and operating characteristics of the turbomachine. Turbomachine vibration has a dynamic range that varies in magnitude and frequency with the operating speed of the turbomachine. An optimal bearing must is have dynamic damping characteristics tailored to the dynamic range of the vibration being applied to the bearing by the particular turbomachine.

Prior art bearings do not accommodate very well the inevitable elevation misalignments between bearings. These prior art bearings become unevenly loaded when there is misalignment with the rotor or other bearings. Misalignments can cause some bearings to bear an excessive load, while other bearings are lightly loaded. An excessive load on a fluid film bearing can reduce the thickness of the oil film to such an extent that the film is inadequate to prevent metal-to-metal contact between the bearing and the journal surface of the rotor. An inadequate oil film can cause exaggerated metal temperatures, extraordinary metal wear and premature failure of the bearing. In addition, the lightly loaded bearings may vibrate with bearing oil whirl which contributes to, rather than dampens, the vibration transmitted from the turbomachine to the bearing support. Accordingly, the inability of prior art bearings to accommodate misalignments is a serious disadvantage of these bearings.

One challenging aspect of squeeze film damper design concerns centering the bearing housing in the bearing case. To achieve acceptable damping from a squeeze film damping assembly, the non-rotatable bearing support member must be able to move within the housing. Elastomer O-rings are often used for this purpose. This is hard to achieve when, even though the O-rings are still adequate to horizontally center the movable bearing support member, the O-rings cannot support the weight of the shaft and bearing, thus permitting the movable bearing support member to rest on the bottom of the housing bore. Additionally, O-ring grooves provided in the bearing housing are offset so that the housing is high in the bearing case. When the rotor is set in the bearing, the rotor gravity load forces the bearing housing down in the bearing case. If the system is designed correctly, the bearing housing ends up being centered in the bearing case with the rotor installed.

There are numerous problems associated with using O-rings in this manner. One such problem relates to the fact that the stiffness of the O-rings is highly is nonlinear, making it difficult to choose the proper diameter and thus stiffness for bearing housing centering. Another problem is that the O-rings deteriorate over time, losing their stiffness thereby allowing the bearing housing to drop down in the bearing case, reducing the effectiveness of the damper. A further problem is that, particularly for rotors that weigh over 3,000 pounds, it is difficult to find an O-ring that will provide sufficient stiffness to counteract large rotor weight.

In order to address these problems associated with using O-rings for centering the bearing housing in the bearing case, mechanical centering devices have been developed. One traditional example of such a mechanical device employs one or more arc springs for centering. However, such systems are disadvantaged in that designing the arc spring(s) resulting in appropriate properties for the each particular bearing configuration is difficult and labor-intensive.

Squeeze film dampers in industrial turbomachinery are more typically used in higher speed machines to control the synchronous response and subsynchronous instability problems not adequately handled by conventional bearings. One recent application is reported in Leader, et al. ["The Design and Application of a Squeeze Film Damper Bearing to a Flexible Steam Turbine Rotor," in *Proceedings of the Twenty-Fourth Turbomachinery Symposium*, pp. 49-58 (1995)], where an 1109 lb steam turbine rotor operating on tilting pad bearings was retrofitted with squeeze film dampers that were centered by 0-rings. This application was successful in reducing synchronous vibration amplitudes at the rotor's first critical speed by over 70 percent.

Many squeeze film damper publications exist in the literature, including Gunter, et al. [*Proceedings of the Fourth Turbomachinery Symposium*, pp. 127-142 (1975)], in which the fundamental damper theory is outlined. Current research includes that by San Andres regarding short squeeze film dampers with a central groove [ASME Journal of Tribology, Vol. 114 (4), pp. (1992)], who concluded that a circumferentially " . . . grooved is damper behaves at low frequencies as a single land damper of effective length equal to the sum of the land lengths and groove width." Development test results have also been presented by Kuzdzal, et al. ["Squeeze Film Damper Bearing Experimental vs. Analytical Results for Various Damper Configurations," in *Proceedings of the Twenty-Fifth Turbomachinery Symposium*, pp. 57-70 (1996)], wherein the results compare the effectiveness of several damper centering devices. The test vehicle used was a specially modified 10 stage high pressure barrel compressor with 4.0 inch diameter tilting pad journal bearings and dummy impeller wheels. The centering devices compared included various 0-ring materials, a hanging spring arrangement, and an arc spring. The authors concluded that " . . . an 0-ring centered damper and a mechanical spring centered damper, both with eccentricities of zero, performed well to suppress subsynchronous vibration." A squeeze film damper tutorial containing a historical perspective, design and analysis procedures, and application examples has also been given by Zeidan, et al. ["Design and Application of Squeeze Film Dampers in Rotating Machinery," in *Proceedings of the Twenty-Fifth Turbomachinery Symposium*, pp. 169-188 (1996)].

Other approaches to solving the problems surrounding the use of squeeze film dampers have been described in the patent literature. For example, U.S. Pat. No. 5,613,781 to Kuzdzal attempts to address these problems. The Kuzdzal patent discloses a damper film bearing assembly for supporting a rotatable shaft within an annular cavity formed in a housing. A fluid film damper mechanism acts between the annular outer surface of a bearing member and the outer wall of the cavity for damping radial movement of the bearing member within the cavity. A resiliently adjustable dead weight spring support system acts between the housing and the bearing member to support the dead weight of the shaft within a vertically centered position within the central bore so that the fluid film damper mechanism functions to maintain the shaft centered within the bore when vibrations occur during rotation of the shaft. The spring support system includes a bolt which engages the bearing member, which bolt is is biased away from the bearing member by a support spring (i.e., plurality of Belleville washers) in order to provide an upwardly directed force to counterbalance the weight of the shaft and the bearing and thereby resiliently urge the bearing member and the shaft upwardly into a centered position within the central bore.

While the device disclosed in the Kuzdzal patent may obviate some of the problems associated with the earlier prior art, it still suffers from a number of disadvantages of its own. For example, the Kuzdzal device is cumbersome and requires machining modifications to the bearing case. The bearing case is a difficult piece to machine as it is large, heavy, cumbersome and difficult to remove from the machine. For a retrofit, customers are reluctant to make a change that requires bearing case modifications. For the original equipment manufacture with a new machine, any changes to the bearing case would require deviation to a standard part, issuing new drawings and additional time and thus money spent on machining. Customers are often reluctant to do this.

A further disadvantage of the device described by Kuzdzal is that it would need to be assembled with the bearing case to set and check the pre-load of (i.e., the proper tightening of) the disc spring bolt and thus the proper compression of the disc springs to properly support the rotor. A additional disadvantage of the Kuzdzal device is that in order to remove the bearing from the bearing case, it is necessary to disengage the disc spring bolts. As such, the pre-load must be re-set upon re-assembly, which is time and labor intensive.

What is desired, therefore, is a centering device for squeeze film dampers which is relatively easy, and not labor intensive, to design and adapt to the configurations of particular bearings, which is not prone to losing its effectiveness over time, which provides sufficient stiffness to counteract large rotor weight, which is not cumbersome and does not require machining modifications to the bearing case, and which does not require that the pre-load be set upon assembly and re-set upon each re-assembly.

The inventions disclosed and taught herein are directed to improved centering devices for squeeze film dampers that are easy to design and adapt to configurations of particular bearings, which are not prone to losing their effectiveness over time, and which provide sufficient stiffness to counteract large rotor weight.

BRIEF SUMMARY OF THE INVENTION

It is an object of the present invention to provide a centering device for squeeze film dampers which is relatively easy, and not labor intensive, to design and adapt to the configurations of particular bearings.

Another object of the present invention is to provide a centering device for squeeze film dampers having the above characteristics and which is not prone to losing its effectiveness over time.

A further object of the present invention is to provide a centering device for squeeze film dampers having the above characteristics and which provides sufficient stiffness to counteract large rotor weight.

Still another object of the present invention is to provide a centering device for squeeze film dampers having the above characteristics and which is not cumbersome and does not require machining modifications to the bearing case.

Yet a further object of the present invention is to provide a centering device for squeeze film dampers having the above characteristics and which does not require that the pre-load be set upon assembly and re-set upon each re-assembly.

These and other objects of the present invention are achieved in accordance with one embodiment of the present invention by provision of a damper film bearing assembly for supporting a rotatable shaft, the damper film bearing assembly having a bearing housing having a longitudinal opening passing therethrough for receiving the rotatable shaft. The bearing housing also has at least one radial recess formed in an is outer surface thereof, the recess having a floor. The assembly further includes at least one support piston slideably disposed within the recess in the bearing housing, the support piston slideable within the recess radially toward and away from a central longitudinal axis of the rotatable shaft. At least one resilient element is disposed within the recess in the bearing housing between the floor of the recess and the support piston, the resilient element biasing the support piston away from the axis of the rotatable shaft.

In some embodiments, at least one resilient element comprises at least one bridge spring centering assembly. In some embodiments, at least one resilient element comprises a plurality of resilient elements. In certain of these embodiments, the plurality of resilient elements comprises a plurality of bridge springs. In certain of these embodiments, at least some of the plurality of bridge springs are arranged in parallel. In some embodiments, at least some of the plurality of bridge springs are arranged in series.

In some embodiments, the at least one radial recess formed in the outer surface of the bearing housing comprises a plurality of radial recesses formed in the outer surface of the bearing housing, and the at least one support piston comprises a plurality of support pistons. In certain of these embodiments, the plurality of radial recesses are radially spaced around a circumference of the bearing housing. In certain embodiments, the plurality of radial recesses are spaced longitudinally along the bearing housing.

In accordance with certain embodiments of the present disclosure, a damper film bearing assembly for supporting a rotatable shaft, the damper film bearing assembly is described, wherein the bearing assembly comprises a bearing housing having a longitudinal opening passing therethrough for receiving the rotatable shaft, the bearing housing also having at least one radial recess formed in an outer surface is thereof, the recess having a floor; at least one support piston slideably disposed within the recess in the bearing housing, the support piston slideable within the recess radially toward and away from a central longitudinal axis of the rotatable shaft; and at least one resilient element disposed within the recess in the bearing housing between the floor of the recess and the support piston, the resilient element biasing the support piston away from the axis of the rotatable shaft. In further accordance with this embodiment, the at least one resilient element comprises at least one bridge spring or at least one rod spring. In yet another aspect of this embodiment, the at least one resilient element comprises a plurality of resilient elements.

In yet another embodiment of the present disclosure, a squeeze film damper bearing assembly for supporting a rotatable shaft of a turbomachine is described, the bearing assembly comprising a housing having a bore therethrough sized to receive the shaft with a longitudinal axis of the shaft extending at least generally horizontally through the bore; an annular cavity formed-in the housing and open to the bore around a circumference of the bore, the cavity including an annular wall surface which extends generally parallel to a longitudinal axis of the bore; a bearing member movably mounted within the cavity and including an annular radially outer surface, confronting the annular wall surface of the cavity, and a radially inner surface, confronting the shaft to provide bearing support for the shaft within the housing, whereby the bearing member can vibrate horizontally and vertically within the cavity with respect to the housing; a fluid film damper formed between the annular radially outer surface of the bearing member and the annular wall surface of the cavity for damping movement of the bearing member within the cavity; and at least one resilient spring element mounted so as to extend generally upwardly from an upper portion of the bearing member to the housing for resiliently supporting the bearing member at a vertically centered position within the bore in opposition to a dead weight of the shaft, so that the at least one resilient spring element can function to center the bearing member within is the bore of the housing and permit the fluid film damper to function to suppress vibration of the shaft. In further accordance with this embodiment, the at least one resilient spring element is a bridge spring or a rod spring. In further accordance with this embodiment of the present disclosure, at least some of the at least one of bridge springs or rod springs are arranged in parallel, while in accordance with other aspects, at least some of the at least one of bridge springs or rod springs are arranged in series.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

FIG. 11 illustrates an enlarged, partially cross-sectional view of an exemplary bearing assembly, showing in greater detail the rod spring centering devices of FIG. 10 for squeeze film dampers.

FIG. 12 illustrates an enlarged, partially cross-sectional view of an exemplary bearing assembly of the present disclosure, showing in detail an alternative embodiment including the centering devices of FIG. 10 for squeeze film dampers.

Figure 1:
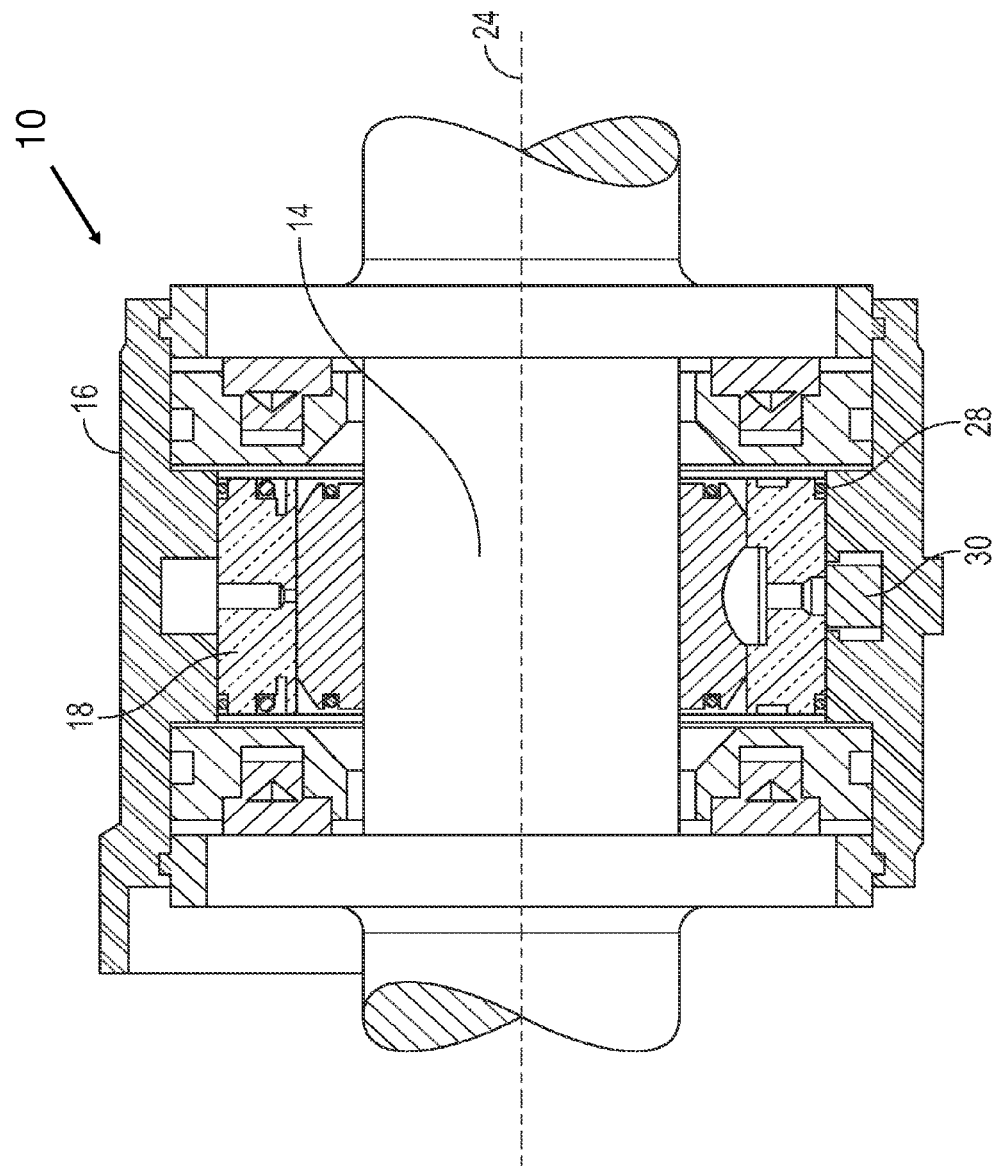
FIG. 1 illustrates a side, partial cross-sectional view of an exemplary squeeze film damper bearing in accordance with the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific is decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created an improved squeeze film bearing support system for use with machines having rotatable shafts and for supporting a rotatable shaft of a turbomachine or the like.

Figure 2:
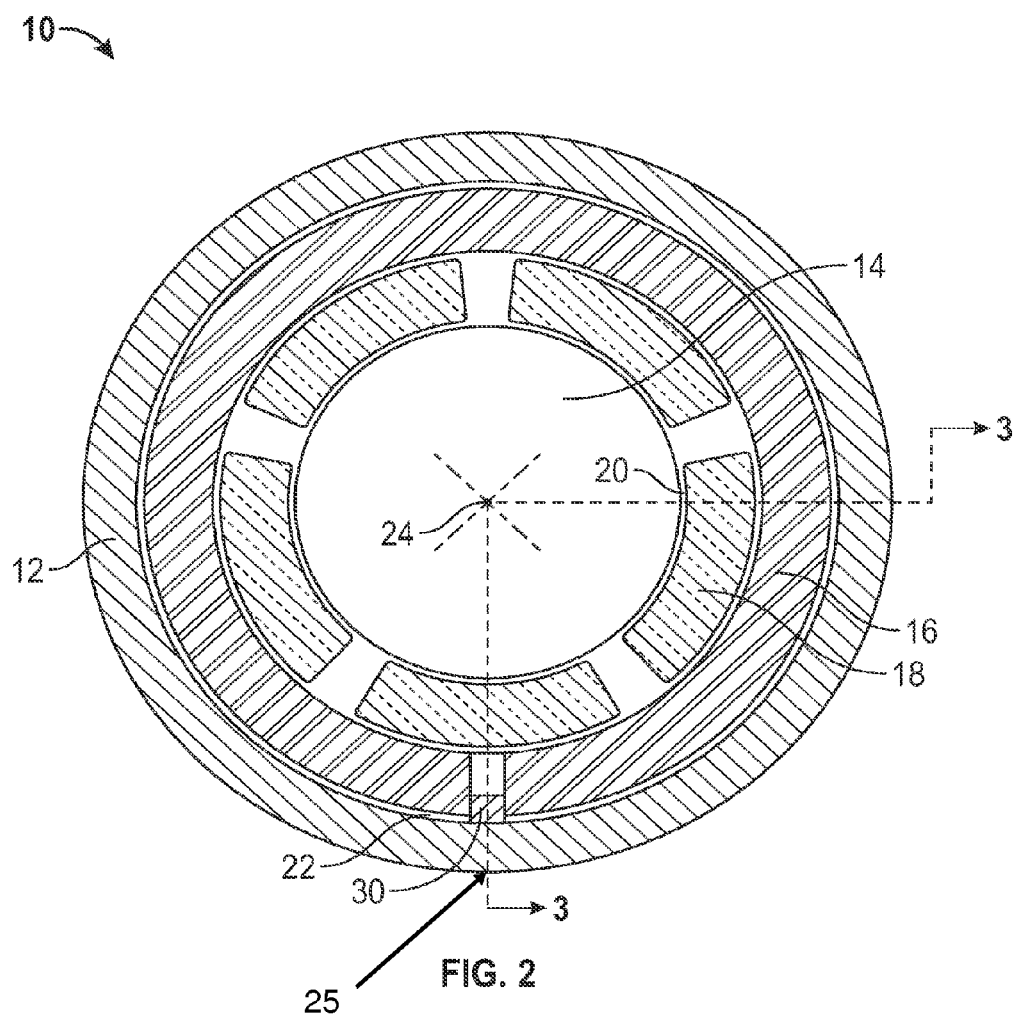
FIG. 2 illustrates a partial cross-sectional view of a bearing assembly incorporating a centering device for squeeze film dampers in accordance with an embodiment of the present disclosure.

Turning now to the figures, FIGS. 1 and 2 illustrate generally a presently preferred embodiment of the present disclosure as a damper squeeze film bearing assembly 10 for supporting a rotatable shaft 14 of a turbomachine or the like. The damper squeeze film bearing assembly 10 (and other bearing squeeze assemblies described herein) is shown disposed circumferentially about and concentric with the rotatable shaft 14, with the longitudinal axis 24 constituting the longitudinal axis of the damper film bearing assembly 10 and the longitudinal central axis of the rotatable shaft 14. Unless otherwise stated, radial directions are directions which are radial to the central longitudinal axis 24, and longitudinal directions are those generally parallel to the central longitudinal axis 24.

Referring to FIG. 1 and FIG. 2 a bearing assembly 10 generally includes an adapter ring or bearing case 12, a rotating shaft or journal 14, a bearing housing 16, and a plurality of bearing tilting pads 18. Bearing tilting pads 18 are slightly radially spaced from journal 14 so as to create a space 20 for receiving a bearing oil film, provided generally for lubrication and friction reducing purposes. Bearing housing 16 and bearing case 12 are also slightly radially spaced so as to create a space 22 for receiving a damper oil film. Bearing case 12, bearing housing 16, and bearing tilting pads 18 are disposed circumferentially about and concentrically with rotatable shaft 14.

It should be noted that since the structure and operation of bearing assemblies as described in the preceding paragraph are well known in the art, a detailed description thereof is not provided herein. It should also be noted that while the disc spring centering devices in accordance with various embodiments of the present invention is depicted and described herein in connection with tilting pad journal bearings, they can be utilized with substantially any type of fluid film journal bearings such as fixed geometry sleeve bearings or hydrostatic bearings. They can also be used in conjunction with anti-friction or rolling element bearings.

Figure 3:
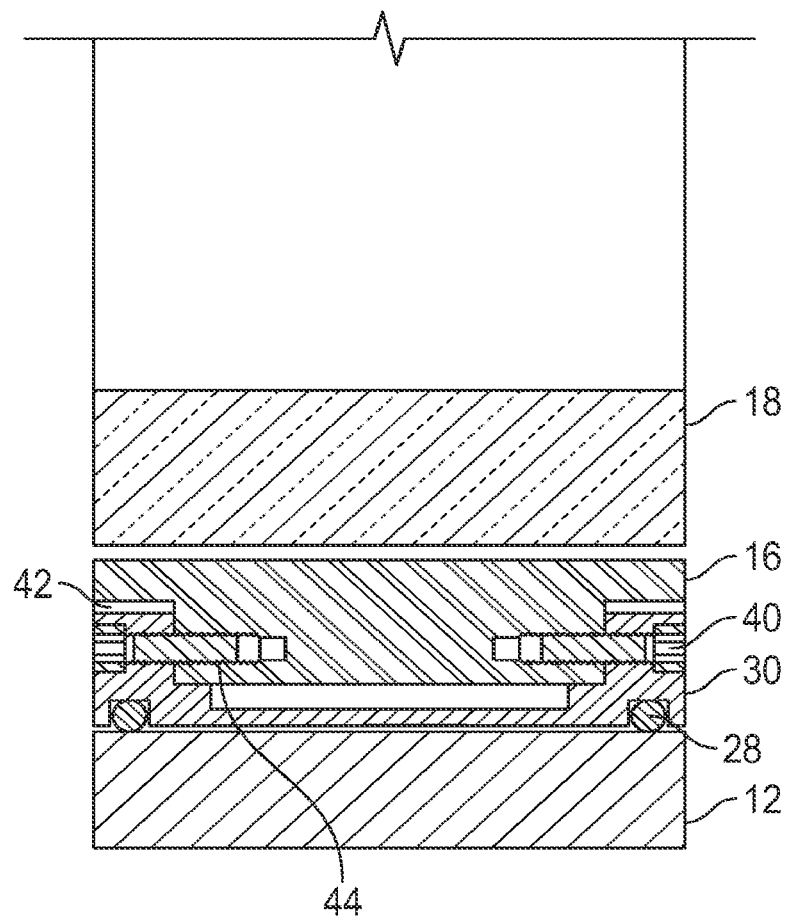
FIG. 3 illustrates an enlarged, partially cross-sectional view, taken along line 3-3 of FIG. 2, showing in greater detail the centering device for squeeze film dampers.
Figure 7:
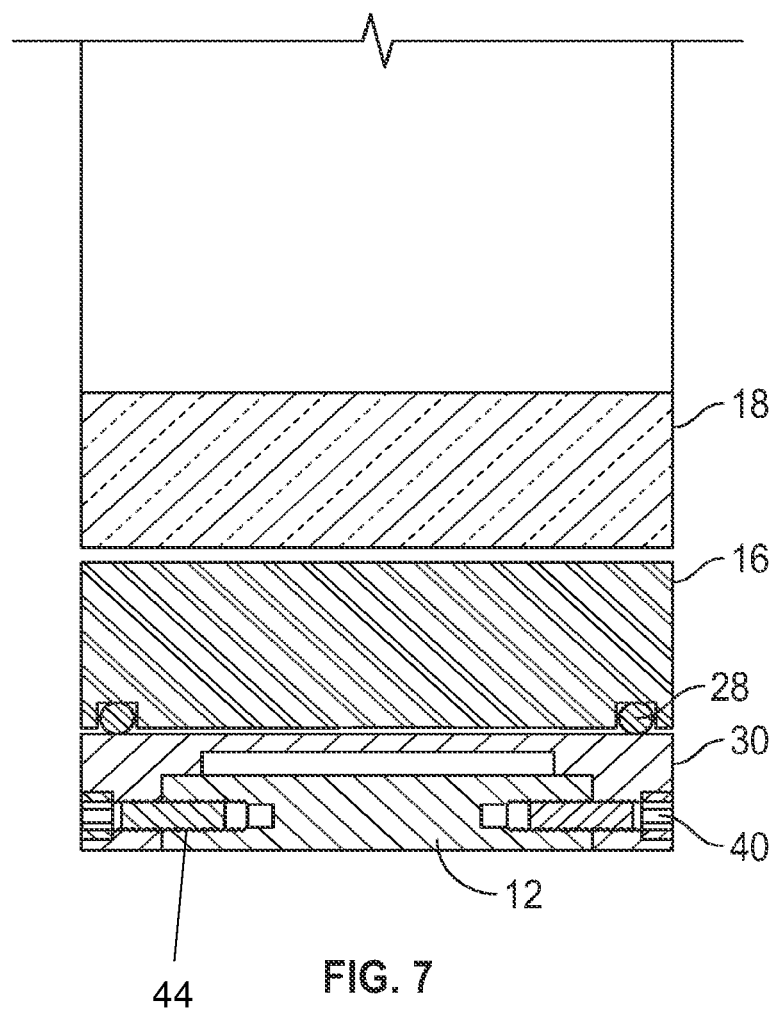
FIG. 7 illustrates an enlarged, partially cross-sectional view of an exemplary bridge spring, showing in greater detail the centering device for squeeze film dampers.

Still referring to FIG. 1, as well as to FIG. 2 and FIG. 3 (a partial cross-section of FIG. 2, taken along line 3-3), bearing assembly 10 also includes centering device 30 (such as a bridge spring), located between a pair of elastomer O-rings 28, for centering bearing housing 16 within the bearing case 12. Unlike prior art devices which rely upon O-rings to serve centering purposes, O-rings 28 of bearing assembly 10 are provided only to inhibit damper oil from leaking out from within space 22 provided therefore, not for providing a centering load-bearing function. Centering device 30, which is relatively simple in configuration and easy to design, can be a bridge spring such as detailed in FIG. 4 or FIG. 10, preferably formed from a hardened metal material, slideably disposed within a recess 42 provided in bearing housing 16. Preferably, recess 42 is generally circular in cross-section, although such is not required. As illustrated in FIG. 3, a threaded bolt 40 may cooperate with a recess 44 formed into housing 16, and simultaneously with the bridge spring 30 via appropriately located holes (31, 33) therethrough, mating the bridge spring 30 and the appropriate housing section together. As illustrated in the embodiment of FIG. 7, threaded bolt 40 may cooperate with a recess 44 formed into the bearing case 12, simultaneously with the bridge spring 30 via appropriately located holes in the bridge spring 30. Interior recess 44 may be threaded or non-threaded, depending upon the characteristics of the bolt 40. Additionally, one or more backing washers (not shown), which are preferably flat washers formed from a hardened metal material, may optionally be provided between the interface of bridge spring 30 and the outer region of recess 44 within the housing.

Figure 4A:
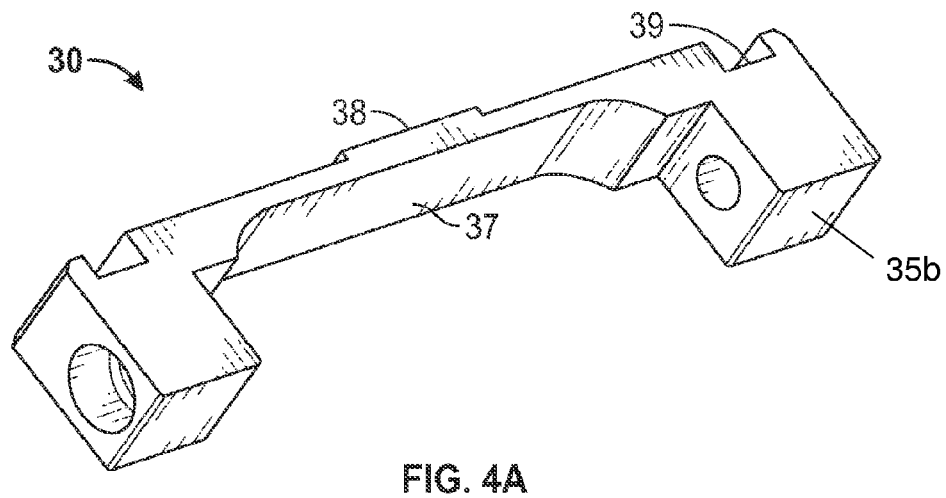
FIG. 4A illustrates a lower perspective view of an exemplary bridge spring assembly in accordance with embodiments of the present disclosure.
Figure 4B:
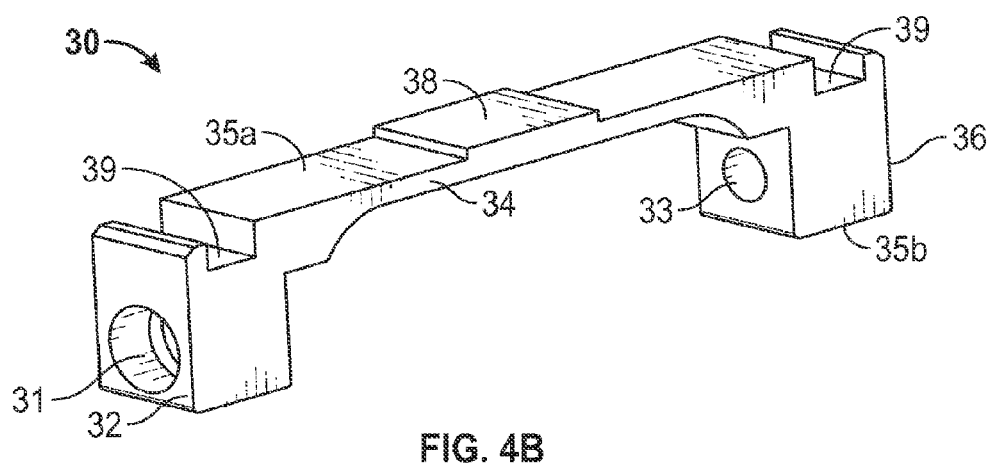
FIG. 4B illustrates an alternative perspective view of the exemplary bridge spring assembly of FIG. 4A.

FIGS. 4A and 4B illustrate the details of an exemplary bridge spring 30 as a centering device in accordance with the present disclosure. Bridge spring 30 comprises first and second spaced apart ends 32 and 36, connected by a support bracket element 34 spanning and extending between the interior edges of ends 32 and 36. Ends 32 and 36 each have at least one orifice 31, 33 extending therethrough, sized to accept retaining bolt 40 during installation of the centering device into the assembly 10. At the interface of the top of the ends 32 and 36, where the ends merge with the bracket element 34, a recess 39 is formed, the recess 39 being substantially parallel to the top face 35a and the bottom face 35b of the bracket element 34. The bottom face 37 of spanning bracket element 34 may be shaped accordingly, depending upon the apparatus the centering device is to be engaged with. Recess 39 is sized to retain the O-rings 28 during installation, as shown generally in FIG. 3. The bridge spring 30 further includes a feature, such as upwardly-extending rib 38, to facilitate the joining and alignment of the bridge spring element 30. In this embodiment, the rib 38 extends upward from the top face 35a of the bracket element, and is sized to fit a groove in bearing case 12 or bearing housing 16. Alternatively, the feature (such as rib 38) can simply act as a centering device to support the element 30 such that the damper oil film and associated space between the O-rings is maintained, and does not interface with a mating groove. Preferably, the support bracket 34, and ends 32 and 34 are all formed is of one piece of rigid material, such as steel or an appropriate alloy.

Figure 5:
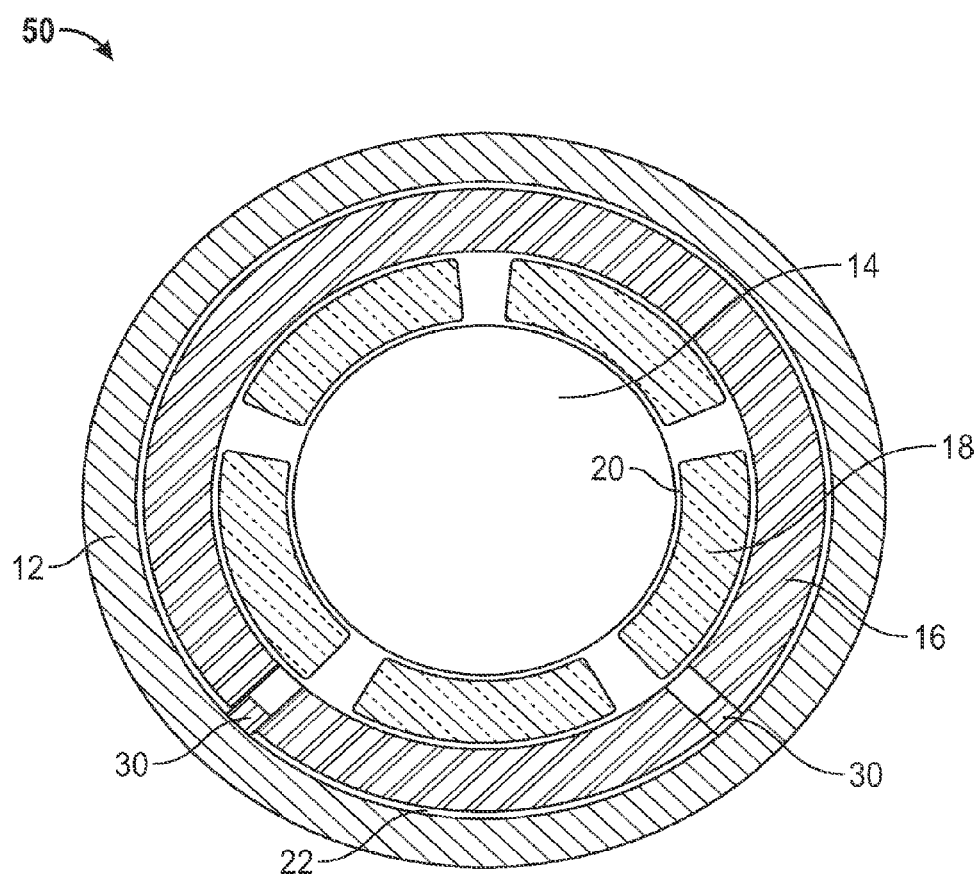
FIG. 5 illustrates a partial cross-sectional view of a bearing assembly in accordance with embodiments of the present disclosure, wherein the bearing assembly includes multiple bridge spring centering devices for squeeze film dampers in alternative orientations.
Figure 6:
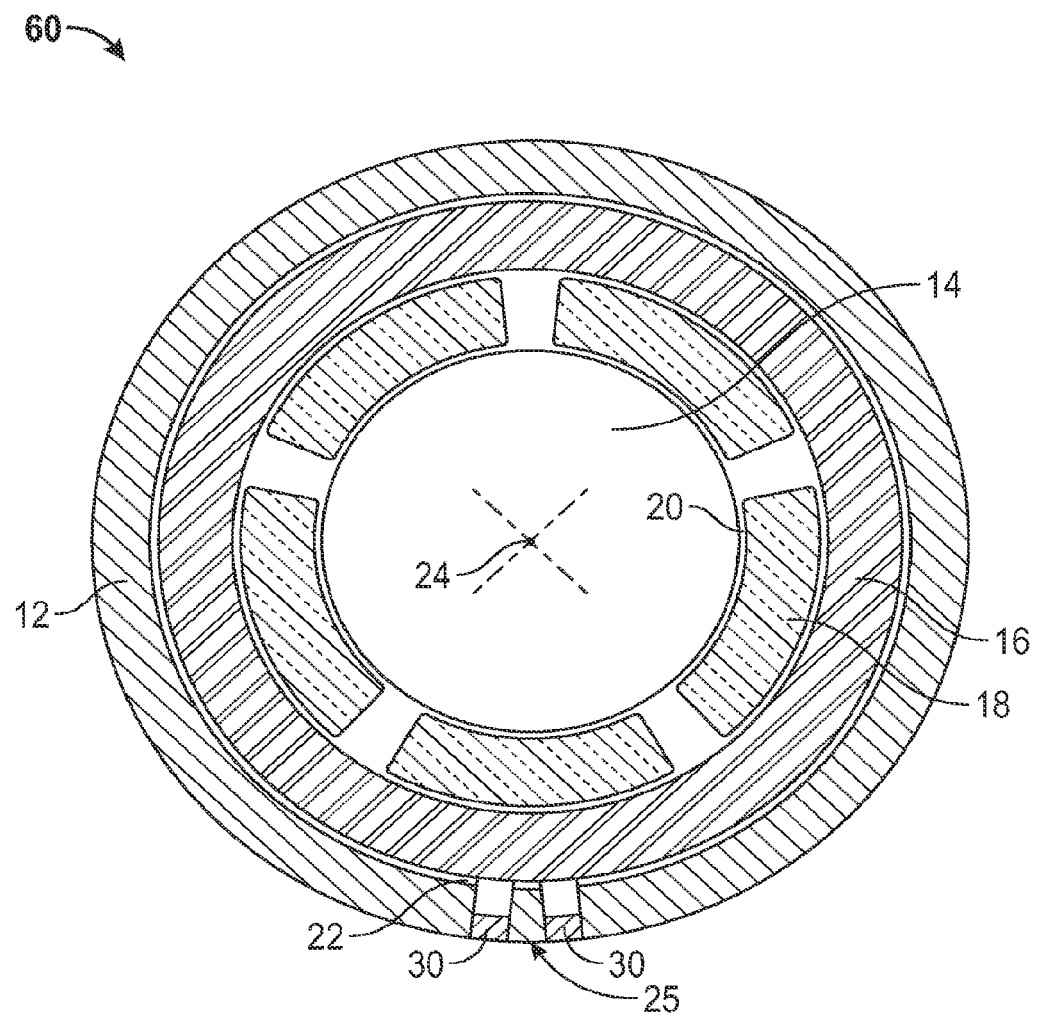
FIG. 6 illustrates a partial cross-sectional view of a bearing assembly in accordance with embodiments of the present disclosure, wherein the bearing assembly includes multiple bridge spring centering devices for squeeze film dampers located at the bottom dead center of the adapter ring.
Figure 8:
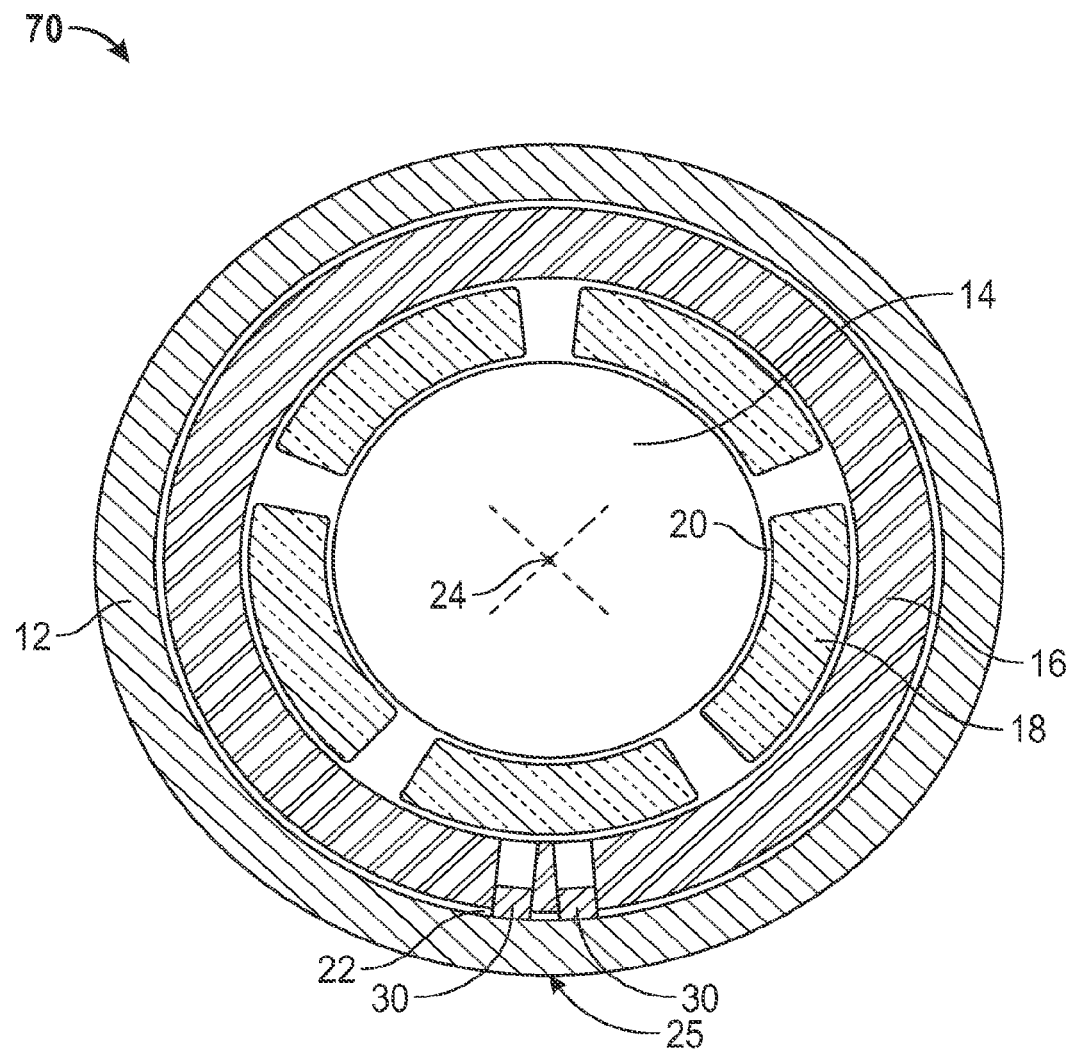
FIG. 8 illustrates a partial cross-sectional view of a bearing assembly in accordance with embodiments of the present disclosure, wherein the bearing assembly includes multiple bridge spring centering devices for squeeze film dampers.
Figure 9:
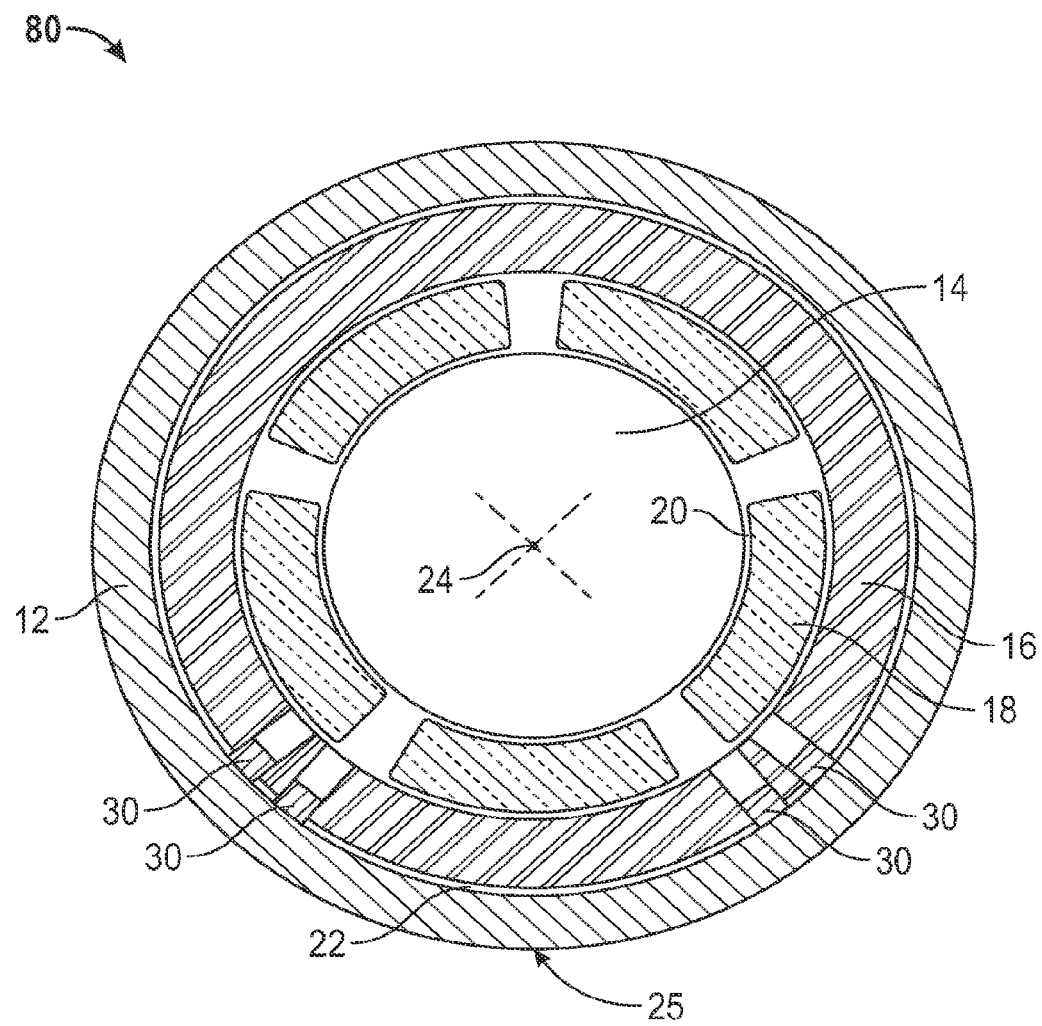
FIG. 9 illustrates a partial cross-sectional view of a bearing assembly in accordance with embodiments of the present disclosure, wherein the bearing assembly includes two sets of multiple bridge spring centering devices for squeeze film dampers.

Centering devices 30 may be placed in any circumferential location around the bearing housing 16 outside diameter (as shown in FIGS. 2, 6 and 8) or around the bearing case 12 inside diameter. For example, and without limitation, one centering device, such as bridge spring 30, may be located at approximately (within about 5°) bottom dead center 25 (as shown in FIG. 2), two (or more) centering devices (30) may be located at approximately (within about 5°) bottom dead center 25 (as shown in FIGS. 6 and 8), or two (or more) centering devices 30 may be located at approximately (within about 5°) 45° from bottom dead center (as shown in FIGS. 5 and 9). In the latter configuration, the two centering devices 30 also offer horizontal support to the bearing housing 16. Two or more centering devices 30 (a plurality) may also be placed in parallel, side-by-side axially (not shown), at any circumferential location either in the bearing housing 16 or in the bearing case 12.

For any of the aforementioned configurations, single (shown in FIG. 7A) or multiple (shown in FIG. 7B) resilient elements 30 (i.e., bridge or rod springs) may be used. When used in multiples, the resilient elements (i.e., bridge or rod springs) may be arranged entirely in parallel, entirely in series, or in any combination thereof.

As noted above, and referring again to FIG. 7 in particular, although it is most desirable for centering devices 30 to be located within recesses formed within bearing housing 16, there may be instances when such is not possible. For example, as shown in FIG. 7, the bearing housing 16 may not allow for such, due to thickness considerations, the type of material, or the like. In such cases, it may be desirable to locate centering devices 30 within recesses formed within bearing case 12 (or within the adapter ring if one is provided). It should be understood by those skilled in that art that what is meant by "adapter ring" is a member that is provided in situations where the interface between the existing bearing housing 16 and bearing case 12 is not conducive to a damper. In these cases, an adapter ring may be built which matches is up with the bearing case 12 at its outside diameter while providing the damper surface at its inside diameter. In such case, centering devices 30 can be located in the adapter ring (similar to the way centering devices 30 are located in bearing case 12 in FIG. 7) and both the adapter ring and bearing housing 16 can be rolled into the existing bearing case 12.

In accordance with the present disclosure, centering devices, such as bridge spring 30 (and rod spring 100) may be generally and broadly referred to as resilient elements 90, which preferably comprise at least one, and possibly more than one (as described more fully below), bridge spring, rod spring, or both. The stiffness of the bridge spring 30 may be linear. Additionally when more than one resilient element 90 (i.e., bridge spring 30) is employed, they can be stacked in parallel or in series to help tune the overall centering stiffness.

As discussed above, FIGS. 8 and 9 illustrate the location of multiple centering devices, e.g., bridge spring 30, around the interior periphery of the bearing case 12, such as at or approximately at bottom dead center 25 (FIG. 8), or at approximately (within about 5°) 45° from bottom dead center 25 (FIG. 9). It should be recognized that, depending upon the specific device, multiple centering devices, or bridge springs, may be used, and may be spaced apart around the outer circumference of the bearing housing 16 (or, as the case may be, the bearing case 12), at any number of intervals, so long as the intervals are approximately equal to each other about the circumference, e.g., approximately 36° from bottom dead center, approximately 60° from bottom dead center, approximately 72° from bottom dead center, or approximately 90° from bottom dead center.

Figure 10A:
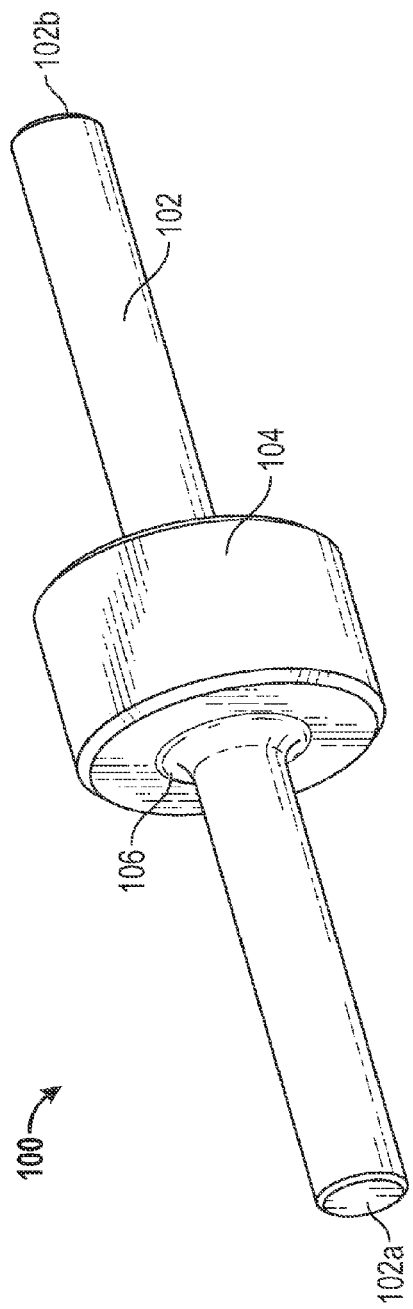
FIG. 10A illustrates a perspective view of a first, exemplary, alternative spring assembly in accordance with embodiments of the present disclosure.
Figure 10B:
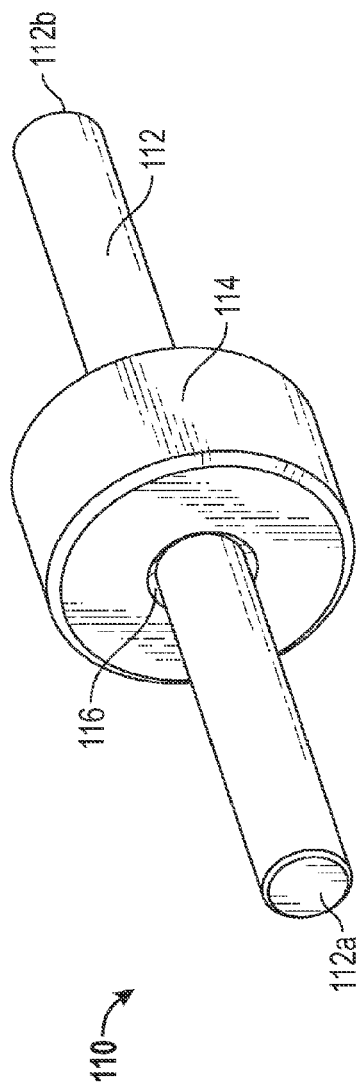
FIG. 10B illustrates a perspective view of a second exemplary, alternative spring assembly in accordance with embodiments of the present disclosure

Turning to FIGS. 10A and 10B, alternative bridge spring assemblies 100 and 110 suitable for use as centering devices in accordance with the present disclosure are illustrated. FIG. 10A illustrates a circular cross-section bridge spring (or rod spring) 100 as a solid assembly, comprising a central shaft or rod 102, having oppositely located first and second ends 102a and 102b, respectively. Rod 102 is in two pieces, each piece extending outward from the axial center of the planar face of spring 104, being connected to the exterior of spring 104 via a physical connector 106 adjoining the rod with the planar face of the spring 104, or via any other suitable attachment means, such as via welding. In FIG. 10B, an alternative construction for a circular cross-section bridge spring 110 is illustrated. The circular bridge spring 110 includes a central rod, or shaft, 112, having oppositely spaced first and second ends 112a and 112b, respectively, and a circular bridge spring 114. As illustrated in the figure, spring 114 is located substantially in the center of rod 112, intermediate (e.g., at the midpoint between) the first and second ends. Bridge spring 110 is of two piece construction, in that the spring 114 further comprises a suitably-sized central bore 116 extending through the center of the planar face of the spring (thus making spring 114 generally taurus-shaped). Central bore 116 is sized and shaped to accommodate the insertion of rod 112 therethrough, and may optionally include a retaining means (such as threads, locking washers, or the like) to retain spring 114 in position along rod 112 once the rod passes through the bore 116. While rods 102 and 112 are illustrated in the figures to be tubular and have a circular cross-section, it will be appreciated that they may be of any appropriate shape and cross-section, without limitation, include square, hexagonal, and triangular. It will also be understood that there can be a plurality of springs on a rod, as appropriate.

In accordance with aspects of the disclosure, as well as with the bridge springs previously described, during the use of these resilient elements (30 or 100), both spring and damping forces increase at approximately the same rate under loading, dynamic or static.

Rod spring 100 or 110 may be placed within the bearing housing 16, above the bearing case 12, as shown in FIG. 11, or within the bearing case 12, as shown in FIG. 12. With reference to FIG. 11, rod spring 100, 110 is inserted within a recess 120 formed within the bearing housing 16, the recess having first and second recesses 122 and 124 sized to fit the spring and rod portions of the rod spring 100, 110, respectively. As with other embodiments described herein, the rod spring of this embodiment is above bearing case 12, and between O-rings 28, extending upwardly from near the inner surface of bearing case 12 towards the interior face of bearing housing 16, proximate tilting pads 18. As shown in the figure, a part of the outer edge of the rod spring may extend downwardly toward, and abut or approximately abut the inner face of the bearing case 12, within the space 22 for receiving damper oil film. With reference to FIG. 12, an embodiment is illustrated wherein the rod spring (100 or 110) is located in the bearing case 12. Similar to the embodiment shown in FIG. 11, when it is necessary to include the rod spring within the bearing case 12, rather than the bearing housing 16, the bearing case 12 will include a shaped or formed recess 130 to accommodate the rod spring 100, 110 within the bearing case. Such a recess 130 has first and second formed recesses 132 and 133 sized to fit the spring and rod portions of the rod spring (100 or 110) respectively). In this embodiment, the outer edge of the side face of the rod spring abuts or approximately abuts the bottom, exterior face 17 of bearing housing 16, while being intermediate between the O-rings 28, and within the space 22 for receiving damper oil film.

With the inventive designs as described above in connection with the figures, the centering device and associated resilient element 90, such as bridge spring 30 or rod spring 100, is incorporated in the bearing housing 16 which the bearing supplier typically manufactures. Thus, for retrofits or for new machinery, no changes and no machining are necessary on the bearing case 12. The bearing with damper and centering device can simply directly replaces the original bearing, i.e., roll out the old bearing and roll in a damper bearing incorporating one or more centering devices according to the present invention. For retrofits, this advantageously minimizes expensive down time of the machine.

The present invention, therefore, provides a centering device for squeeze film is dampers which is relatively easy, and not labor intensive, to design and adapt to the configurations of particular bearings, which is not prone to losing its effectiveness over time, which provides sufficient stiffness to counteract large rotor weight, which is not cumbersome and does not require machining modifications to the bearing case, and which does not require that the pre-load be set upon assembly and re-set upon each re-assembly.

Other and further embodiments utilizing one or more aspects of the inventions described above can be devised without departing from the spirit of Applicant's invention. For example, while bridge bearings of particular shape are shown, other shapes or geometries can be used, particularly as mandated by the machining of the machines into which they are to be included. Additionally, the resilient elements 90 need not be a single type of element, e.g., rod springs only, but rather can be used in combination, such that an assembly including such resilient elements may include both bridge springs 30 and rod springs 100, in a variety of arrangements with respect to each other, such as in an alternating arrangement. Further, the various methods and embodiments of the method of use can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. is Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A damper film bearing assembly for supporting a rotatable shaft, the damper film bearing assembly comprising:
    an outermost bearing case having outer and inner surfaces;
    a rotatable shaft;
    a plurality of bearing tilting pads disposed circumferentially about the rotatable shaft and radially spaced apart from the rotatable shaft so as to create a circumferential space therebetween for receiving bearing oil;
    a bearing housing disposed circumferentially about the rotatable shaft and intermediate between the bearing case and the tilting pads, and radially spaced apart from the bearing case so as to create a circumferential space therebetween for receiving damper oil;
    at least one radial recess provided in an outer diameter surface of bearing housing intermediate between the inner surface of the bearing case and the bearing housing; and
    at least one centering device disposed within the recess in the bearing housing, the at least one centering device being intermediate between two O-rings,
    wherein the at least one centering device provides centering load bearing support to the rotatable shaft.

2. The damper film bearing of claim 1 wherein the at least one centering device comprises at least one bridge spring.

3. The damper film bearing assembly of claim 1 wherein the at least one centering device comprises a plurality of centering devices.

4. The damper film bearing of claim 3, wherein the plurality of centering devices comprises a plurality of bridge springs.

5. The damper film bearing of claim 4 wherein one or more of the plurality of bridge springs are arranged in parallel.

6. The damper film bearing of claim 4 wherein one or more of the plurality of bridge springs are arranged in series.

7. The damper film bearing of claim 1 wherein the at least one radial recess formed in the outer diameter surface of the bearing housing comprises a plurality of radial recesses formed in the outer diameter surface of the bearing housing.

8. The damper film bearing of claim 7 wherein the plurality of radial recesses are radially spaced around a circumference of the bearing housing.

9. The damper film bearing of claim 7 wherein the plurality of radial recesses are spaced longitudinally along the bearing housing.

10. The damper film bearing assembly of claim 1 wherein the bearing case comprises a generally continuous wall without radial holes passing completely therethrough.

11. The damper film bearing of claim 1, further comprising a recess formed in the bearing housing and an end of the at least one centering device, sized to receive a coupling device to mate the at least one centering device within the recess of the outer diameter surface of the bearing housing to the bearing housing.

12. The damper film bearing of claim 1, wherein the centering device comprises first and second spaced apart ends connected by a support bracket having top and bottom opposite faces and extending between interior edges of the first and second ends.

13. The damper film bearing of claim 12, wherein the at least one centering device further comprises an orifice extending through the first and second ends.

14. The damper film bearing of claim 12, further comprising a recess formed in the top surface of each of the first and second spaced apart ends, at an interface with the support bracket, the recess being substantially perpendicular to the top face of the support bracket.

* * * * *